W. W. HOPKINS.
COMPUTING AND WRITING MACHINE.
APPLICATION FILED AUG. 28, 1905.

1,133,029.

Patented Mar. 23, 1915.
6 SHEETS—SHEET 3.

Attest

Inventor
William W. Hopkins
by J. D. Rippey
Att'y.

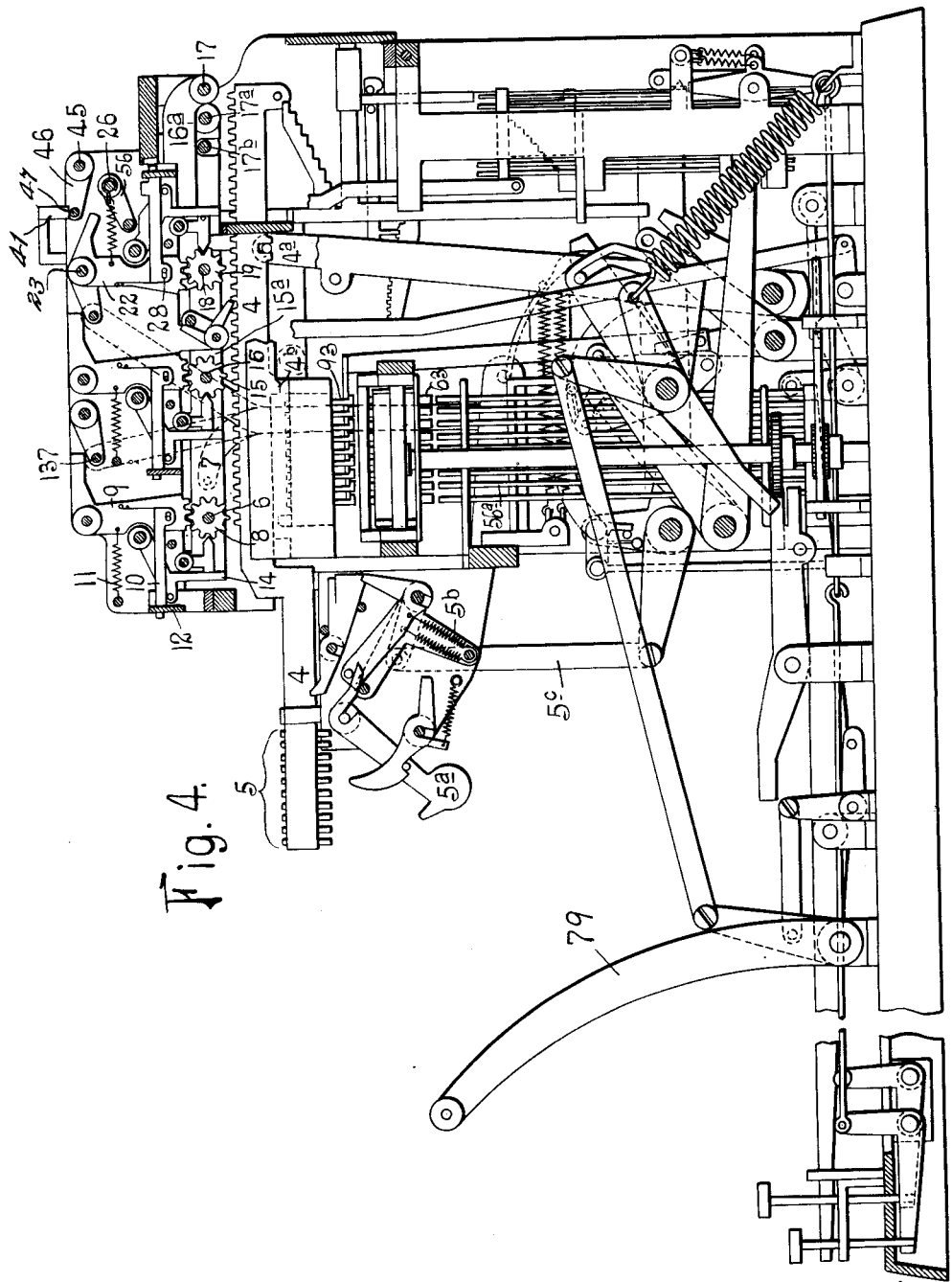

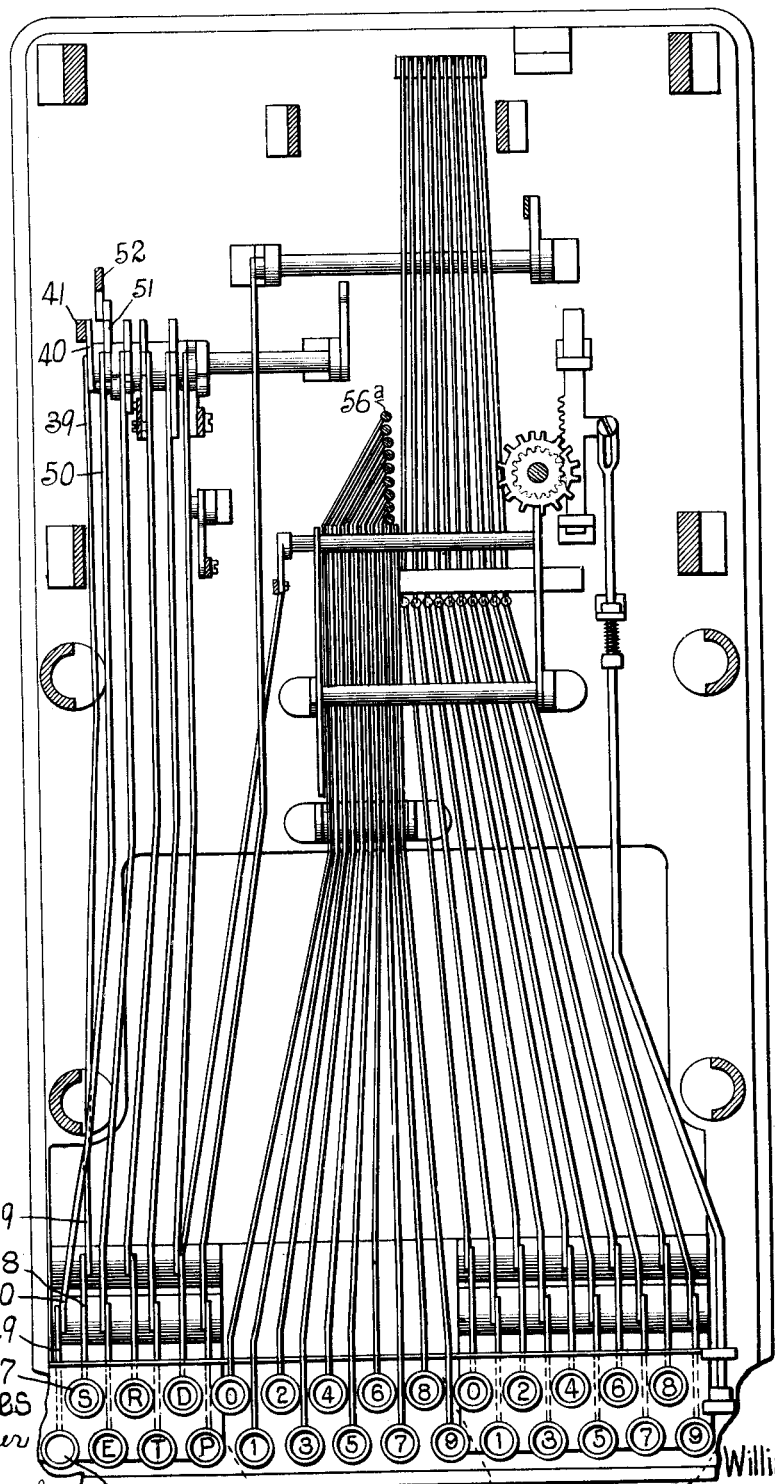

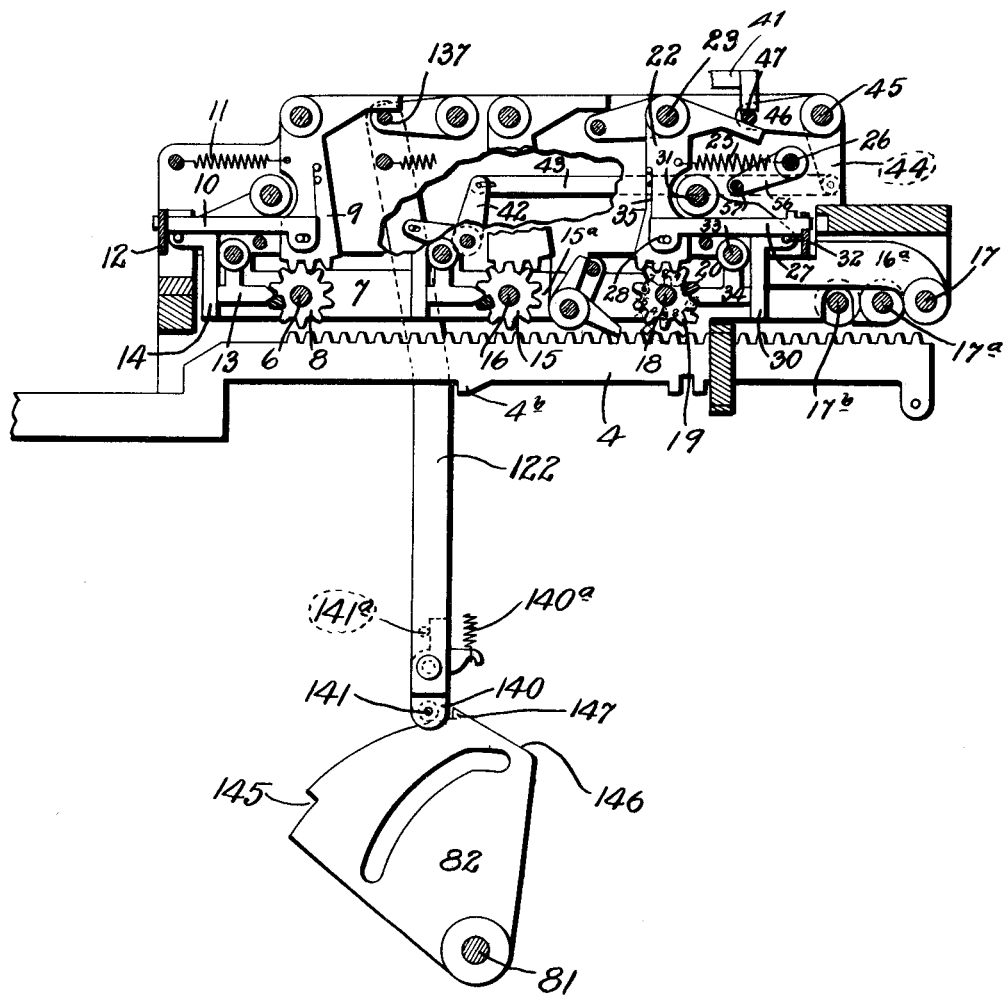

UNITED STATES PATENT OFFICE.

WILLIAM W. HOPKINS, OF ST. LOUIS, MISSOURI, ASSIGNOR, BY MESNE ASSIGNMENTS, TO THE MOON-HOPKINS BILLING MACHINE COMPANY, OF ST. LOUIS, MISSOURI, A CORPORATION OF MISSOURI.

COMPUTING AND WRITING MACHINE.

1,133,029.   Specification of Letters Patent.   Patented Mar. 23, 1915.

Application filed August 28, 1905. Serial No. 276,064.

*To all whom it may concern:*

Be it known that I, WILLIAM W. HOPKINS, a citizen of the United States, residing at St. Louis, State of Missouri, have invented certain new and useful Improvements in Computing and Writing Machines, of which the following is a specification.

This invention relates to computing and writing machines, the object being to provide such machines with mechanism operable in connection with the adding mechanism, to subtract numbers and retain the remainder in the machine, which remainder may be recorded.

Figure 1:
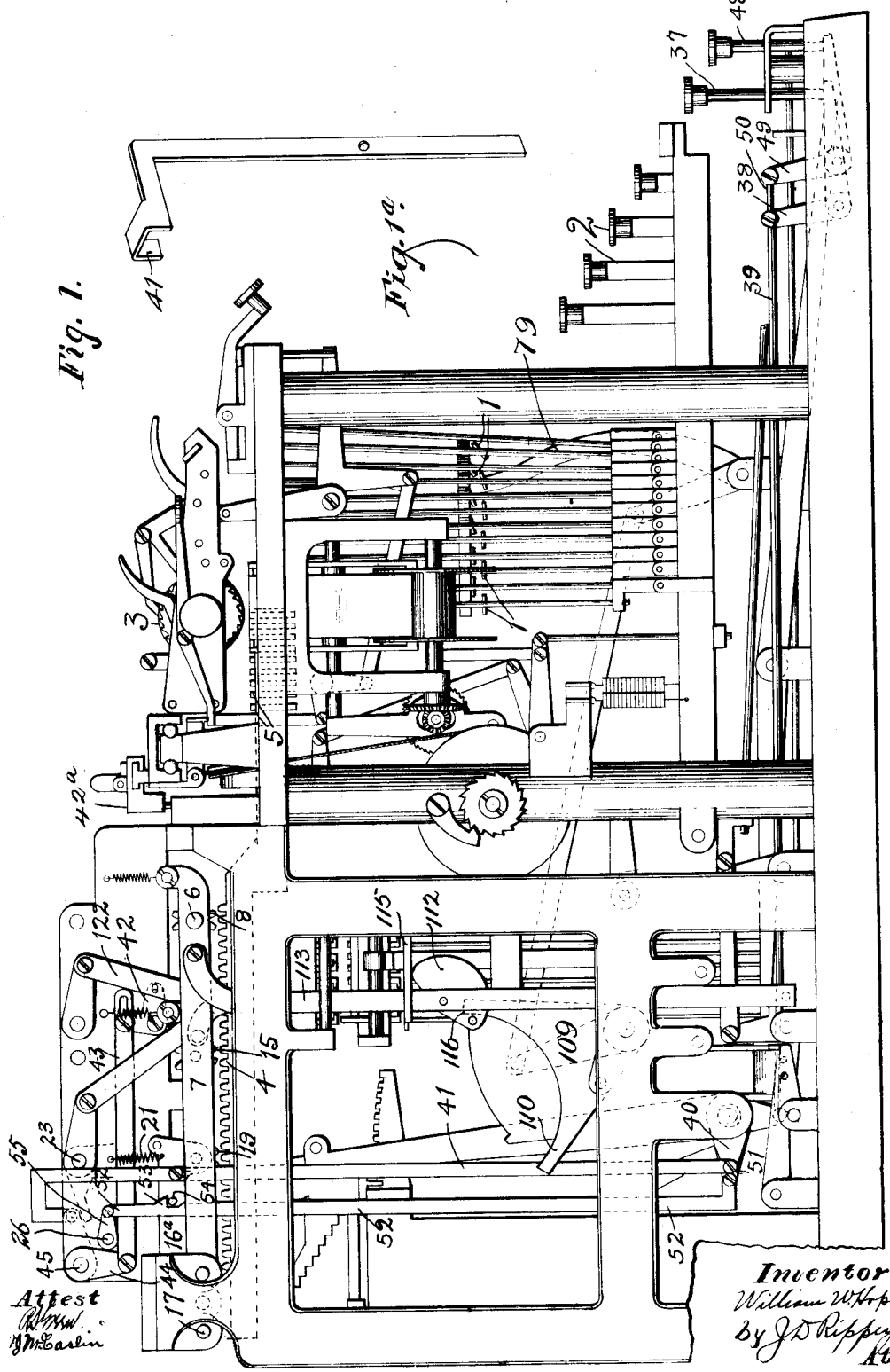
Figure 2:
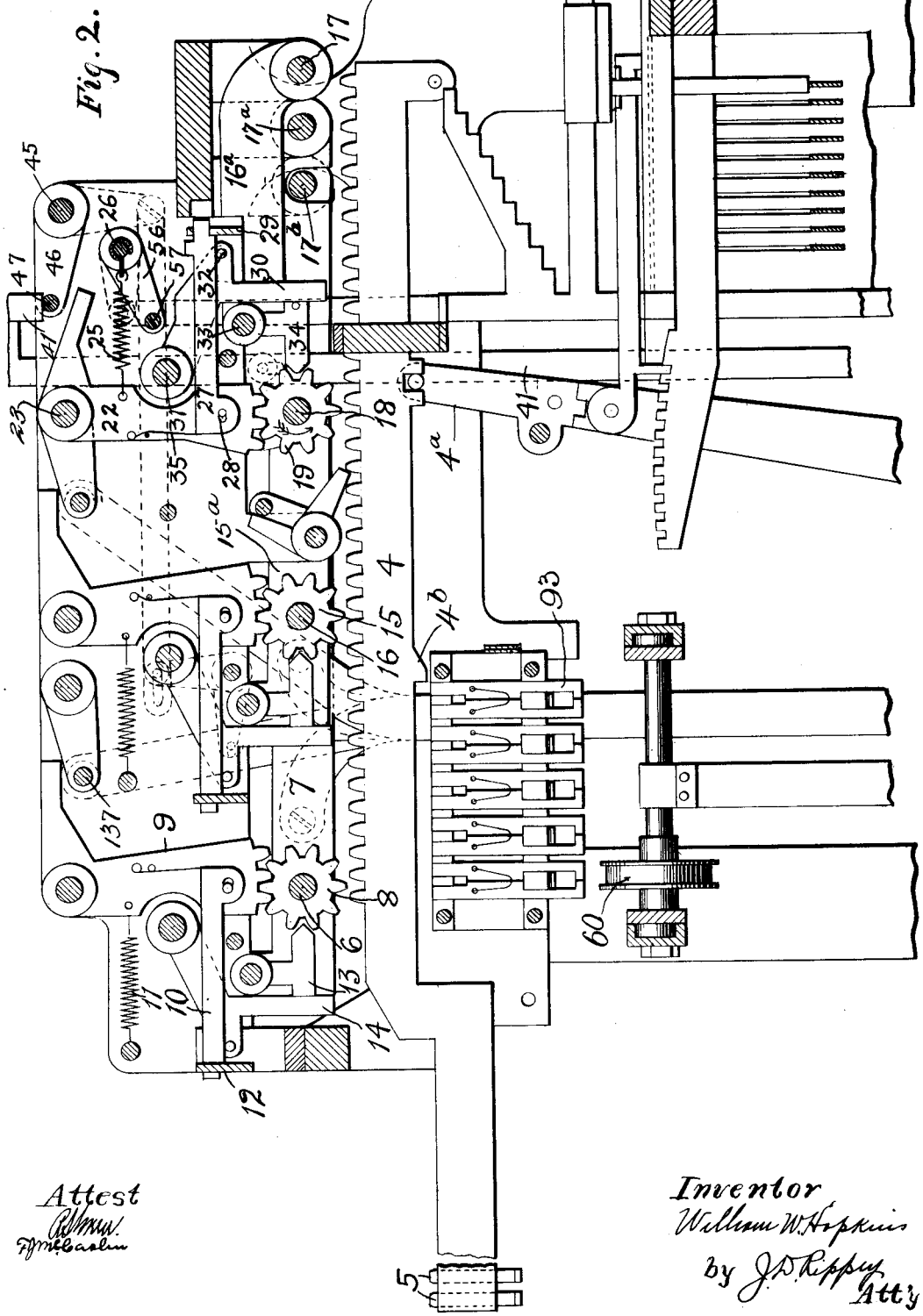
Figure 3:
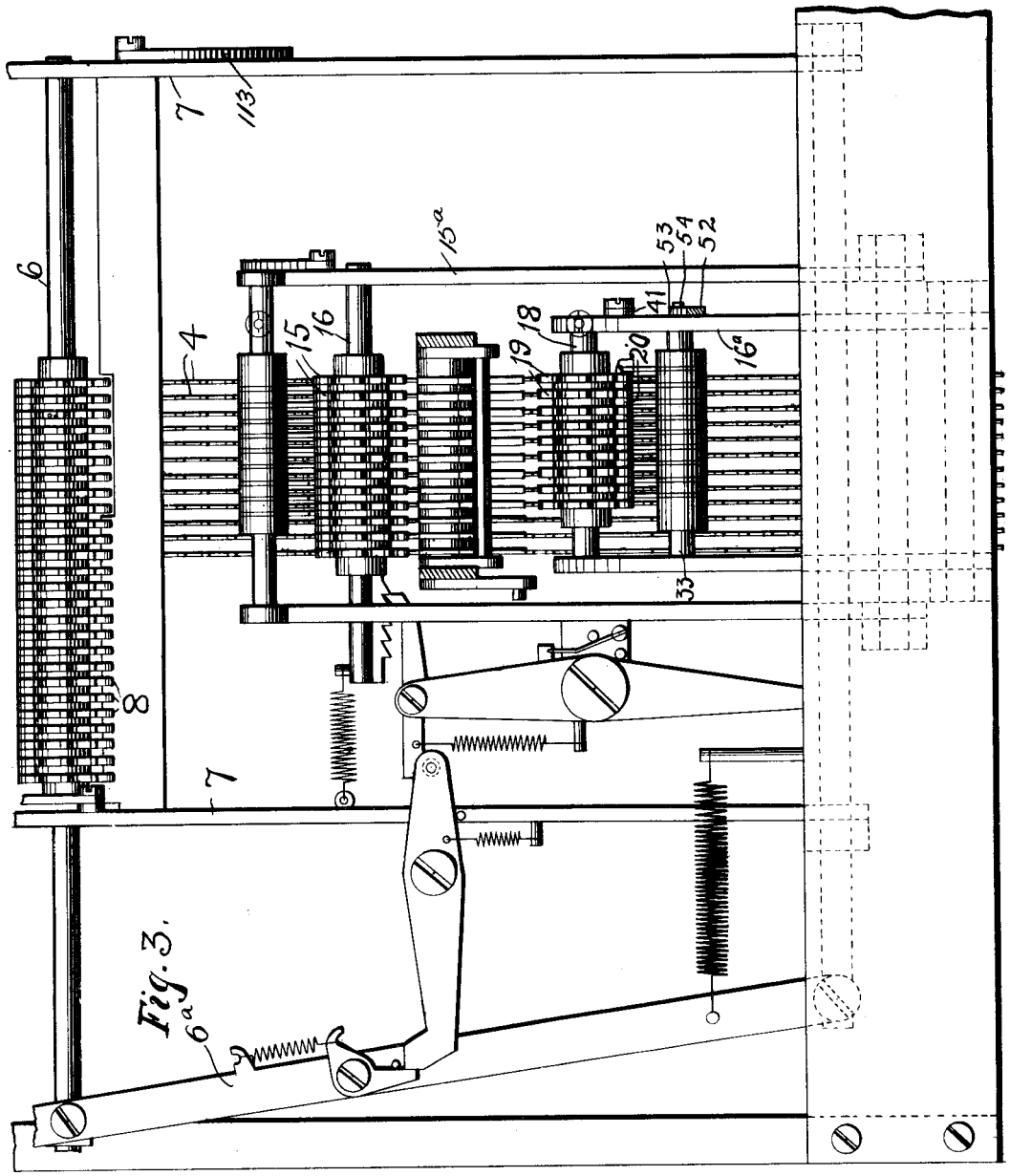

Figure 1 is a side elevational view of a combined typewriting and calculating machine having my improvements embodied therein; Fig. 1ª is a detail view. Fig. 2 is a sectional view through the rear upper portion of the machine showing my improvements embodied therein; Fig. 3 is a plan view partly in horizontal section of the mechanism shown in Fig. 2; Fig. 4 is a longitudinal sectional view partly in side elevation as seen from the opposite side of the machine shown in Fig. 1, the typewriting mechanism and laterally movable carriage being omitted to more clearly show the details of the machine and the manner in which my improvement is embodied therein; Fig. 5 is a plan view of the keys and key bar connections of the calculating machine; and Fig. 6 is a view illustrating the carrying mechanism in a different position.

The typewriting mechanism used in connection with the calculating mechanism shown in the accompanying drawings may be of any suitable character or design. I have illustrated one form of typewriting mechanism in which, 1 indicates the type bars, 2 the typewriter keys, and 3 the platen on the laterally movable carriage which supports the sheet of paper to be printed upon. The type-carrying rack bars 4 which are identified with the calculating mechanism are moved backward and forward as required to record various numbers on the papers supported by the platen 3 by means of levers 4ª having slot and pin connections therewith, see Fig. 4, which levers are actuated by a handle 79 located at the right hand side of the machine, and which is designed to be grasped by the operator and pulled forward in performing the operations of the calculating machine.

Various features of the calculating machine shown in the accompanying drawings are illustrated in Belgian Patent, No. 202,081 dated Aug. 21, 1907, and in a pending application of Hubert Hopkins, Serial No. 310,739, filed April 9, 1906, said patent and application being a composite continuation of applications serially numbered 189,031, filed January 14, 1904, and Number 225,758, filed September 24, 1904, and Number 249,369, filed March 10, 1905, by said Hubert Hopkins, and I therefore shall not describe the same in detail as such features are not claimed by me and form no part of my present invention except where they coöperate with the minuend register as will hereinafter appear. I deem it sufficient to describe only the essential parts of the machine forming the subject-matter of the said Hubert Hopkins application together with the operations thereof and therefore I shall omit all reference to details.

The type-carrying rack bars 4, referred to, constitute type-carriers and carry at their forward ends type 5, which type are designed to be moved into printing line under the paper supported by the platen 3 by means of the levers 4ª controlled by the operating handle.

5ª are the type hammers, there being one hammer for each series of type carried by a rack bar and these type hammers are actuated by impelling springs 5ᵇ, means being provided for releasing the individual type hammers so as to make a printing impression only of type which have been moved to printing position, together with the zero type to the right thereof.

I shall not describe the details of the printing hammer mechanism as the same forms no part of my present invention and will conclude my reference thereto by stating that the bar 5ᶜ, actuated by the operating handle, restores the type hammers 5ª to normal operative position after they have made a printing impression.

A indicates the group of keys, see Fig. 5, which is identified with the adding mechanism and the key bars of these keys extend rearwardly and terminate under vertical bars 56ᵃ, which vertical bars coöperate with setting-up pins 63 arranged in a traveling carriage. A spring in a drum 60, see Fig. 2, is connected by a cable, not shown, to the traveling carriage and exerts an energy to pull this carriage from right to left so as to place longitudinal series of setting-up pins 63 successively over the upper ends of the vertical bars 56ᵃ whereby when a key in group A is struck a pin 63 will be elevated and an escapement mechanism operated which permits the traveling carriage to move toward the left one step and place another series of pins over the upper ends of the bars 56ᵃ, and when another key in group A is struck a pin 63 in the series located thereover will be elevated. This operation of setting up an example in the setting-up pins in the traveling carriage continues until all of the pins 63 to be elevated are elevated.

When the handle is pulled the traveling carriage referred to is bodily lifted so that the elevated pins 63 will lift stop pins 93 thereover and position stops in front of shoulders or projections 4ᵇ on the rack bars 4, thus, when said racks 4 move forwardly they will be arrested in one of nine different positions depending upon the position of the stop pins 93 which have been elevated. If no digital stop pin 93 has been elevated in the series of higher orders then the zero stop pins, which are automatically positioned when the traveling carriage is elevated, will prevent movement of the racks 4.

The group of keys B, shown in Fig. 5, are the multiplier keys which are operated when an example is set up in the multiplying devices in order to obtain the product. I shall not describe these multiplying devices further than to say that multiplying plates identified with the tens and units partial products are successively lifted after a key in group B is depressed and the operating handle 79 pulled twice. The partial products thus obtained are, through the racks 4, registered and added together in the rear totalizer wheels 15 which in this operation of the machine may be designated as the product totalizer.

The keys shown in Fig. 5 bearing the letters "R", "D", "E", "T" and "P" correspond to the keys similarly marked in applications No. 249,369 and No. 310,739, are known as result keys and when any of said keys are depressed and the handle pulled certain operations are performed in the machine. I shall not describe the operation of these result keys and their connections further than to say:

"R" is the initial of recording and when an example is set up in the keys of group A the "R" key pressed, and the handle pulled, said example will be introduced into one of the forward groups of totalizer wheels 8 and at the same time set up in the multiplying devices.

"D" is the initial of decimal, and this key is pressed when it is desired to bring into operation a fraction or decimal rack bar. By setting up an example on keys in group A and pressing the "D" key a number may be registered in the wheels 15, ordinarily employed as the product register, and thus the product register may become a primary registering totalizer.

"E" is the initial of extending and by pressing this key and pulling the handle a number previously introduced into the register wheels 8 may be transferred to and set up in the multiplying mechanism.

"T" is the initial of total, and when this key is pressed and the handle pulled the total of numbers registered in wheels 8 may be recorded on the paper supported by the platen 3.

"P" is the initial of product, and when this key is pressed and the handle pulled the product register in the wheels 15 may be recorded on the paper.

There are two groups of totalizer wheels 8 shown in Fig. 3, one of which groups is in operative relation to the rack bars 4, and in the operation of the machine these groups may be shifted by mechanism under control of the laterally movable carriage so that one or the other group may be placed in an idle or in an active position as desired by the operator. The shaft 6 upon which the wheels 8 are mounted, is slidingly mounted in a frame 7 whose rear end is hinged to the frame of the machine so that the frame 7 may be swung vertically to engage and disengage the wheels 8 with the rack bars 4. One end of shaft 6, the left-hand shown in Fig. 3, is connected to a lever 6ᵃ whose forward end carries parts, not shown, projecting in the path of adjustable stops 42ᵃ carried by the typewriter carriage whereby the movement of the typewriter carriage positions the groups of totalizer wheels 8.

113 is a rod carrying a tappet 112 coöperating with a fixed plate 115 and with projections 110 and 116 of a rocking plate 109. This plate 109 rocks when the handle 79 is pulled and causes the wheels 8 to engage with the rack bars 4 before said rack bars start on their rearward movement in order to register a number set up on the keys of group A, therein. When the "T" key is pressed the wheels 8 are thrown into engagement with the racks 4 before said racks start on their forward movement and thus the total of numbers registered in the wheels 8 is yielded and the type carried by the racks 4 are properly positioned to record said total. By holding the "T" key down and maintaining engagement between the wheels 8 and racks 4 the total may be re-registered in the wheels 8 when the operating handle restores the racks 4 to normal position.

Carrying sectors 9 coöperate with the wheels 8 and each of these sectors coöperates with a shouldered bar 10 coöperating with a notched plate 12, see Fig. 2. Springs 11 are connected to the sectors 9.

Pendants 13 coöperate with tripping pawls 14 to displace the shouldered bars 10. Pendants 13 are operated by zero projections on the wheels 8. This carrying mechanism is fully set forth in the said application of Hubert Hopkins and I deem it unnecessary to describe the details of construction and the operation thereof here further than to say that whenever a wheel 8, (each wheel 8 is provided with ten teeth) makes a complete revolution the pendant 13 trips the carrying mechanism rendering the springs 11 effective to move the sector 9 and advance the next additional wheel of higher order the distance of one tooth. The vibrating bar 137 coöperates with the rearward extensions of the sectors 9 and permits the effective operation of said sectors 9 by the springs 11 and also restores the sectors to normal position after the carrying operation. Means are provided for timely operating the bar 137 so as to insure the operation of the sectors 9 at the proper moment and in proper time relation to the other parts of the machine. The product register wheels 15 have carrying mechanism similar to the register wheels 8.

The shaft 16 is mounted in a swinging frame 15ª, see Figs. 2 and 3, which shaft is pivotally mounted on a rod 17ª. The swinging frame 7 which carries the register 8 is swingingly mounted on a rod 17ᵇ, see Fig. 2. A frame 16ª is pivoted to the shaft 17 and carries a shaft 18 on which is a group of wheels 19 arranged much similar to the wheels 8 and 15. That is to say, each wheel has ten teeth corresponding to the figures or digits, and the "0" tooth on each wheel has a lug 20. The frame 16ª is upheld by a spring 21, see Fig. 1, but may be lowered to cause the wheels 19 to mesh with the racks 4. A sector 22 suspended on a rod 23 meshes with each wheel 19. The sectors 22 are actuated rearward by springs 25, interposed between, and connected with, said sectors and a rod or shaft 26. On each of said sectors is a link 27, having pin and slot connection 28 therewith, the rear ends of said links resting in notches in a cross piece 29, and having shoulders bearing against said cross piece to hold the sectors 22 forward. If, however, said links be raised slightly the shoulders will be above said cross piece, and then the springs 25 can act to operate sectors 22, rearward, which operation will be referred to again herein. For each of the links 27 there is an angular lever 30, said levers being pivoted on a rod 31 and projecting downward between, or alongside of, the links 27. Each lever 30 has a pin or lug 32 projecting under one of the links 27 so that if said lever be pushed backward it will raise the link 27 and release the shoulder thereon from the cross piece 29. A shaft 33 supported by the frame 16ª extends crosswise just in front of the lower ends of the levers 30 and a series of pawls 34 is suspended therefrom, there being one pawl for each wheel 19. Said pawls project forward between the wheels 19 just below the lugs on the "0" teeth of said wheels. The rear ends of said pawls abut against the front edges of the levers 30, so that when the wheels 19 turn backward beyond "0" position they will swing the pawls rearward and thereby operate the levers 30 and the links 27. Each link 27 is actuated rearward by a spring 35, and when any link is raised, as just described, its spring pushes it backward until the shoulder rests on the cross piece 29, the pin and slot connection 28 permitting such operation. Each pawl communicates with the sector of the next higher order; that is to say, the pawl 34 which is operated by the wheel 19 in units order controls the lever 30 and link 27 on the sector 22 in tens order, and so on through the series. When any wheel 19 is turned backward until its "0" tooth passes beyond its idle position, which is just above the point of the pawl 34, the lug on the "0" tooth of the wheel so moved pushes the pawl 34 backward and thereby releases the link 27 on the sector 22 in the next higher order from the cross piece 29. The sector being thus released from restraint by its link would instantly be swung backward by its spring 25 were it not for a restraining rod 47 which will be referred to again. When the frame 16ª is lowered to mesh the wheels with the racks by depressing the subtraction key, the bent upper end of rod 41, operated by said key, by engaging rod 47 will cause the rod 47 to engage arms on the sectors 22 and hold the sectors against movement, when their links 27 are released, until the wheels are again in mesh with the sectors. As soon as the wheels are raised into mesh with the sectors by release of the subtraction key, any of the latter which had been released will be drawn rearwardly, thereby turning the wheels controlled thereby one step or tooth backward, movement of the sectors being stopped by the rod 31. The rod 47 is automatically raised above the arms of the sectors 22 sufficient to permit such operation.

It will be seen from the above that the borrowing mechanism for the wheels 19 operates just the reverse from the carrying mechanisms for the wheels 8 and 15 in effecting borrowing in the operation of subtraction. The cam 82 which operates a tappet on rod 122 is provided with a cut-away portion 145 at its front upper edge so that the roller or pin 141 normally lies therein and and on the forward stroke of the handle, the tappet 140 has its lower end rocked forwardly so that the roller 141 will ride idly over the concentric portion of cam 82 without operating the bar 122, said roller passing over the heel portion 147 of cam 82 and dropping behind the inclined cam face 146 at the rear upper edge of said cam when the handle reaches the forward limit of its movement. As the handle starts back, the bar 122 is lifted because the tappet maintains its vertical position and rests against the pin 141ª on bar 122, being drawn to such vertical position by means of a spring 140ª. The initial rearward movement of the handle lifts the bar 122 and restores all of the carrying segments identified with the wheels 8 and 19, which may have been tripped, by virtue of the bell crank 42 and the connecting link 43, in readiness for another tripping operation. To prevent the sectors 22, when being restored as above described, from operating the wheels 19, the key 48 is depressed and the handle given an idle stroke. When the sectors are thus reset, and key 48 released, another number may be subtracted from the number standing in wheels 19, because the carrying sectors will now operate promptly.

In the instance of the carrying segments 9, identified with the wheels 8, the resetting of the tripped carrying segments occurs after the wheels 8 have been disengaged from the racks and engaged with the carrying segments so that carrying is effected by spring action with respect to these wheels and said wheels at all times stand fully carried so that it is unnecessary to make an idle stroke of the handle before taking a total from these wheels. With respect to the wheels 19, the borrowing mechanism does not require an extra stroke of the handle to reset the sectors 22 before obtaining the correct remainder.

The description of the remaining portion of the mechanism is involved in a description of the operation of the machine in subtracting one of two numbers from the other, which operation I will now set forth. The minuend, which may be either an initial number as struck on the keys, or a total of several numbers added together, or a product produced by operation of the multiplying mechanism, may be represented in either the wheels 8 or the wheels 15. Now when such number, total or product is to be recorded, the wheels (8 or 15) wherein it is represented, are drawn down into mesh with the racks 4 by pressing the "T" or "P" keys, which racks are then moved forward until stopped by the wheels, causing the number therein to be printed. Then the racks are returned to idle position and the number can be introduced into the wheels 19 by lowering them, and holding them in mesh with the racks during backward movement of the latter. For this purpose I provide a key 37 bearing on one arm of a bell-crank lever 38, from which a link 39 extends to a lever 40, which is connected with the frame 16 by a link 41; so that when the key 37, which bears the letter "S" indicating subtraction, is depressed the frame 16ª will be drawn down to mesh the wheels 19 with the racks 4. The key 37 (bearing the letter "S") must be pushed down just before the racks start backward. The subtrahend may also be represented in either the wheels 8 or the wheels 15, or the process of subtraction may be carried out on forward movement of the racks 4, when the subtrahend is that number which is known beforehand and is struck on the keys preparatory to being added or multiplied, or recorded. In either instance the key 37 is depressed to hold the wheels 19 in mesh with the racks 4 while the latter move forward, so that said wheels will be turned in the opposite direction from their former movement. Each wheel will be turned by its rack 4 as many teeth or spaces as there are units in the digit indicated by the rack.

For better demonstration the following problem will assist: Assume that "935" is the minuend and is represented in the wheels 19, and that "649" is to be subtracted therefrom. The units wheel in such case will represent "5," the tens wheel will represent "3" and hundreds wheel will represent "9," the wheels turning, while the number (minuend) is being introduced thereinto, in the direction indicated by the arrow in Fig. 2. Now during the process of subtracting the wheels turn in the opposite direction. Therefore, if "649" be subtracted from "935" the remainder to be correct must be "286" and the wheels must so indicate. The units wheel in this operation will be turned nine teeth from "5" position, and in doing so the "0" tooth trips the pawl 34 that controls the sector 22 in tens place, said sector in tens place however being held against movement by the rod 47 and the arm thereon. The units wheel then passes to position to represent the digit "6" and also trips the sector 22 in tens order. The wheel in tens order represents "3" in "935" and is reversely rotated four spaces as required for the digit "4" in subtracting "649". The "0" tooth on tens wheel also passes beyond its pawl 34 and trips the same, which releases the sector 22 in hundreds place, the wheel in tens order now indicating "9". The wheel in hundreds place is reversely rotated six teeth or spaces from the advanced position at "9" and so indicates "3". Therefore, the hundreds wheel while yet in mesh with the racks indicates "3", tens wheel indicates "9" and units wheel indicates "6," the entire number indicated being "396." Now, it must be remembered the sectors 22 in tens and hundreds places were released from restraint by their links 27, but held against movement by the rod 47. When the racks reach their idle position the key 37 is released, and the spring 21 at once raises the frame 16ª, carrying the wheels 19 into mesh with the racks 22. The rod 47 is also raised above the arms on the sectors 22, whereupon the springs 25 at once draw back those sectors which had been released. The sectors 22 in tens and hundreds place having been released, in the problem will be drawn back one tooth or space, so that the wheel in tens place representing "9" will be reversely rotated to "8" position and the wheel in hundreds place representing "3" will be reversely rotated to "2" position, thereby indicating that the remainder left after taking "649" from "935" is "286" which is correct.

There is a link 122, shown in Fig. 1, which link in the operation of the machine shown and described in said application of Hubert Hopkins aforesaid, operates the vibrating rod 137 which coöperates with the carrying mechanism of the wheels 8. This link 122 is utilized in connection with part of the subtracting mechanism by operating to restore the sectors 22 to idle position after operation. A small bell-crank lever 42 is pivoted to the link 122 by a pin and slot connection, and the opposite end of said lever is connected to a link 43 leading to an arm 44 on a shaft 45, so that when the link 122 is raised or lowered the shaft 45 will be rocked. Two arms 46 on the shaft 45 carry the rod 47 which extends crosswise over rearwardly projecting arms on the sectors 22. The mechanism, it will be remembered, operates to raise the link 122 above its idle position just before the racks 4 start backward, and also before the wheels 8 are raised out of mesh with the racks. Therefore, after a remainder has been introduced in the wheels 19 in the manner above described, upon the next operation of the handle the sectors 22 which had been moved will be restored to idle position, the shaft 45 being rocked by its connections with the link 122, thereby lowering the rod 47 against the arms of the said sectors and moving the sectors until the shoulders on the links 27 drop in front of the cross piece 29. To permit the sectors 22 so to be moved without interference with the wheels 19 the latter must be lowered out of mesh therewith. For this purpose there is a key 48 bearing upon a bell-crank lever 49 from which a rod 50 leads to one arm of a bell-crank lever 51, the other arm of which is connected to a link 52, the upper end of the latter having a projection 53 extending over a lug 54 on the frame 16ª (Fig. 1) so that when the key 48 is pushed down it will draw down the said frame 16ª and thereby the wheels 19. The link 52 is also pivoted to an arm 55 on the shaft 26, which shaft carries two arms 56 that carry a rod 57 extending crosswise over the levers 30, so that downward movement of the said link 52 will cause the rod 57 to be drawn onto the levers 30 which will lock the pawls 34 against movement. Therefore, when the handle is drawn forward, the racks 4 will travel forward until the lugs on the "0" teeth on the wheels 19 strike the ends of the pawls 34, whereupon the recording mechanism will cause the number in the wheels to be printed on the platen. This operation also clears the number (remainder) from the wheels 19 and the same number can be introduced into either the wheels 8, or the wheels 15, or both, during backward movement of the racks, it only being necessary to draw said wheels down into mesh with the racks as is fully described in the application heretofore referred to.

From the above, assuming that the minuend is introduced into the wheels 19, it is obvious that the subtrahend, to be subtracted therefrom, may either be first introduced into the wheels 8 or 15 and then said wheels placed in control of the wheels 19, or the subtrahend may be introduced through the key board to arrest the forward movement of the racks and in this way direct subtraction accomplished. The purpose of the link 43 is to enable the carrying mechanism of the wheels 19 to be operative so as to borrow "1" from a wheel of higher order to a wheel of lower order when the wheel of lower order passes zero. To provide a permanent zero stop to enable the wheels 19 to yield their totals or remainders, the bar 57, operated by the key 48, is provided to prevent the pendants 34 from swinging when the wheels 19 are in engagement with the racks and the racks are moving forward. A record may be made of the minuend introduced into the wheels 19. A record may be made of the subtrahend represented by the key controlled stops or by the wheels 8 or 15 and which number is to be subtracted from the minuend, and a record may be made of the remainder, after pressing the key 48 to provide immovable zero stops for the wheels 19 in obtaining the remainder. The minuend may be composed of a series of numbers separately accumulated into the wheels 8 or 15, or a single number directly introduced into the wheels 19 from the key board and the subtrahend may be composed of a series of items separately subtracted from the minuend, records being made of such transactions and it is immaterial whether in the operation of the machine a subtrahend is first introduced into the wheels 19, when said wheels stand at zero, in which event such subtrahend exceeds the minuend, or whether a minuend, exceeding the subtrahend is first introduced into the wheels 19, the true remainder can be obtained.

When it is desired to record the remainder, the wheels 8 are set to the "9" position and the T key and the key 48 are depressed the latter to provide a fixed zero stop for the wheels 19, and the former to shift the cams 82—109 to their neutral position. If the key 48 is held depressed during the return movement of the racks, the remainder will be retained in the wheels 19 to be again subtracted from, but if it is desired to clear said wheels 19, the key 48 may be permitted to rise when the racks reach their forward limit of movement.

I do not claim in this application features which are shown and described in pending application of Hubert Hopkins, Serial No. 310,739, filed April 9, 1906, except as parts thereof coöperate with my improvement which consist essentially of the addition of the minuend register and its recessional carrying mechanism.

From the foregoing it will be noted that my invention is adapted for combination with any form of adding or computing machine in which the actuating racks or the like can be utilized to impart coördinate movement to the wheels 19. It is preferable that it be incorporated in a machine having recording mechanism and for such reason I have illustrated it as associated with that type of machine herein identified.

As numbers introduced directly into the wheels 19 from the key board are also introduced into the wheels 8 and simultaneously accumulated, it is obvious that the group of wheels 8 containing such numbers may be shifted so as to eventually yield a grand total of such numbers and another group of wheels 8 placed under control of the racks to receive the remainders. If, as described in said application No. 310,739, there are three separate groups of wheels 8 which may be placed in or under control of the racks and it may be that two of such sets of accumulating wheels may stand to represent numbers and it is not desired to disturb such wheels. Therefore, if but one group of wheels 8 is available and this group of wheels has accumulated the numbers composing the minuend and subtrahend introduced directly from the key board into the wheels 19, it is obvious that such an accumulation would be of no value and before obtaining the remainder from the wheels 19, the group of wheels 8 in operative relation to the racks should be first cleared, otherwise, they might interfere with the racks being moved forwardly the proper distance to yield the correct remainder. It may be necessary, therefore, to operate the total key to clear the group of wheels 8 in operative relation to the racks, by pressing the total key, pulling the handle and releasing the total key at the forward limit of movement of the handle so that said group of wheels 8 will stand at zero before it is attempted to obtain the remainder or total represented in the wheels 19. It is also necessary in obtaining a remainder or total represented in the wheels 19, assuming that the group of wheels 8 standing in coöperative relation to the racks are at zero, to press the "T" or "Total" key so as to move the cams 82 and 109 to their second or middle position so that the laterally movable pin carriage will not be raised to position the zero stop pins in the fixed field of stops and thereby prevent the forward movement of the racks. It is also necessary, when the "T" key is depressed to move the cams 82 and 109 to their second position in obtaining a remainder to avoid the interference in the movement of the racks which would result if the wheels 8 stood at zero when the "T" key was depressed, and therefore in the construction shown, after the wheels 8 are cleared preparatory to obtaining the remainder represented in the wheels 19, I introduce "9" in each of the wheels 8 directly from the key board so as to move the tripping projections 20 over pendants 13. This will enable the wheels 8, when engaged with the racks upon the depression of the "Total" key, to permit the racks to move forward without interference; or, a much simpler method of preventing the lifting of the laterally movable pin carriage and in positioning the cams 82 and 109 in their second or neutral position, would be to effect the shifting of the cams manually or mechanically by an appropriate connection with key 48. This connection, however, is not shown in the drawings. When the cams 82 and 109 are positioned in their neutral or second position, the key 48 depressed to render the pendants 34 immovable, the handle is pulled forward to yield its correct total or remainder.

Where a series of items are to be successively introduced into the machine to represent a minuend and a subtrahend, I prefer to introduce the items constituting the minuend into the group of wheels 8 where they are accumulated and where said wheels stand at all times fully carried. By this transferring operation of the minuend, the wheels 8 may be cleared in readiness to be moved to their "9" position to avoid interference with the yielding of a proper remainder from the wheels 19. Of course, where the subtrahend is composed of a series of items, the wheels 8, which accumulate the items constituting the minuend, should be shifted so as to prevent the accumulation of the subtrahend items with the minuend. To accumulate the remainders in the machine, it is obvious that the group of wheels 8, standing at "9" to permit obtaining such remainders, will be disqualified to accumulate the remainders and therefore I prefer to utilize the wheels 15 for remainder-accumulating, which wheels may be engaged with the racks when the handle is forward by depressing the "P" key. In this way, a number of separately obtained remainders may be accumulated in the wheels 15, but as the carrying mechanism identified with the wheels 15 is only operated when the cams 82 and 109 are in their third position, it may be necessary, after introducing a remainder into the wheels 15 and adding it to the number or total represented by said wheels, to press the "D" key and give the handle an idle stroke for the purpose of restoring the carrying mechanism of said wheels 15.

I am aware that various modifications may be made in the construction of the parts and in their combination, and do not confine myself to specific forms or features. Nor do I restrict myself to the combination of the invention with any specific class of machines. But Having described the invention with sufficient fullness to admit of its various arrangements and combinations what I claim as new and desire to secure by Letters Patent is:

1. In a calculating machine, the combination of wheels capable of rotation in one direction to represent a number in the nature of a minuend, racks coöperating with said wheels, means for operating said racks, and means representing a number in the nature of a subtrahend, which latter means is placed in control of said wheels, through the medium of said racks, to rotate said wheels in the opposite direction whereby they represent the remainder.

2. In a calculating machine, the combination of wheels capable of rotation in one direction to represent a number in the nature of a minuend, racks coöperating with said wheels, means for operating said racks, means for controlling the excursions of said racks so that they may be moved to a position to represent a number in the nature of a subtrahend, and means for controlling the engagement and disengagement between the wheels and the racks, whereby said wheels may be reversely rotated so as to represent a remainder.

3. In a computing machine, the combination with adding mechanism and racks for operating the same, of subtracting mechanism separate from the adding mechanism, consisting of a series of wheels adapted to be operated by the racks, and means whereby when any wheel is moved backward beyond its idle position the wheel in the next higher order will be moved backward one step; substantially as described.

4. In a computing machine, the combination with racks and means for moving them, and adding mechanism arranged to operate to represent numbers and to add when the racks move in one direction, of wheels separate from the adding mechanism, means for causing the racks to operate said wheels when the racks move toward idle position as required to adjust said wheels to represent a number, and means for causing said racks to operate said wheels whereby said wheels can be adjusted to represent any desired less number without clearing the previous number therefrom; substantially as described.

5. In a calculating machine, the combination of wheels capable of rotation in one direction to represent a number in the nature of a minuend, racks coöperating with said wheels, means for operating said racks, digit keys and their controlled stops which normally control the excursions of said racks, and means representing a number in the nature of a subtrahend, which latter means is placed in control of said wheels independently of any digit key operation, through the medium of said racks, to rotate said wheels in the opposite direction whereby they represent the remainder.

6. In a calculating machine, the combination of wheels capable of rotation in one direction to represent a number in the nature of a minuend, racks coöperating with said wheels, means for operating said racks, digit keys and their controlled stops for controlling the excursions of said racks so that they may be moved to a position to represent a number in the nature of a subtrahend, and means for controlling the engagement and disengagement between the wheels and the racks, whereby said wheels may be reversely rotated so as to represent a remainder.

7. In a calculating machine, the combination of wheels capable of rotation in one direction to represent a number in the nature of a minuend, racks coöperating with said wheels, means for operating said racks, means representing a number in the nature of a subtrahend, which latter means is placed in control of said wheels, through the medium of said racks, to rotate said wheels in the opposite direction whereby they represent the remainder, and a separate register for totalizing the remainders.

8. In a computing machine, keys, a minuend register, a subtrahend register, means independent of the keys for moving the minuend register to indicate a number, said means also coupling said two registers together to move then in unison, and carrying mechanism for causing the wheels of the minuend register to retreat.

9. In a computing machine, wheels, means for operating them in one direction to represent a number and in the opposite direction to represent a less number, and a sector controlled by each wheel for retreating the wheel of the next higher order one space when so required, and mechanism operable to add a plurality of remainders, in combination with recording mechanism controlled by said wheels and operable to record the remainders and their totals; substantially as described.

10. In a computing machine, subtracting mechanism including a minuend register, and an independently operable subtrahend register, means for causing the subtracting mechanism to determine mechanically the difference between two numbers and indicate the remainder, adding mechanism separate from the subtracting mechanism, and means for operating the adding mechanism to add a plurality of the remainders, said means being mechanically controlled by the minuend register; substantially as described.

11. In a computing machine, subtracting mechanism including a minuend register and an independently operable subtrahend register, means for causing the subtracting mechanism to determine mechanically the difference between two numbers and to indicate the remainder, and mechanism for recording the remainder, adding mechanism, and means for introducing the remainder therein when the recording mechanism operates, said means being mechanically controlled by the minuend register; substantially as described.

12. In a computing machine, a minuend register, a subtrahend register, means for connecting said two registers together to determine the difference between the numbers registered in each, and printing devices positioned by said connecting means for recording the remainders so produced; substantially as described.

13. In a computing machine, a minuend register, a subtrahend register, means for connecting said two registers together to determine the difference between the numbers registered in each, printing devices positioned by said connecting means for recording the remainders so produced, and a separate register for adding together the remainders so recorded; substantially as described.

14. In a calculating machine, the combination with a totalizer, a minuend register, racks for actuating said totalizer, said racks, in certain operations, coupling said totalizer and minuend register together, and recessional carrying mechanism coöperating with the minuend register; substantially as described.

15. In a calculating machine, the combination of a totalizer, a minuend register, racks for actuating said totalizer, said racks in certain operations coupling said totalizer and minuend register together, progressive carrying mechanism coöperating with the totalizer, and recessional carrying mechanism coöperating with the minuend register; substantially as described.

16. In a calculating machine, the combination with a plurality of totalizers, a minuend register, racks for actuating a selected totalizer and said minuend register together, said racks in certain operations operating a selected totalizer independently of the minuend register; substantially as described.

17. In a calculating machine, the combination with shiftable groups of totalizer wheels, actuating devices therefor, means for positioning a selected group in operative relation to said actuating devices, a minuend register, and means for engaging said minuend register with said actuating devices, whereby a number may be transferred from a positioned group of totalizers to said minuend register; substantially as described.

18. In a calculating machine, the combination with a laterally movable paper carriage, of two or more groups of totalizer wheels whose position is controlled by said carriage, actuating devices for said totalizers, and a minuend register capable of coöperating with a group of totalizers in operative relation to said actuating devices; substantially as described.

19. In a calculating machine, the combination with actuating devices, a swinging frame carrying totalizer wheels 8 adapted to mesh with said actuating devices in certain operations of the machine, a swinging frame carrying totalizer wheels 15 adapted to mesh with said actuating devices in certain other operations of the machine, and a swinging frame carrying register wheels 19 adapted to mesh with said actuating devices only when wheels 8 of the wheels 15 are in mesh therewith; substantially as described.

20. In a calculating machine, the combination of actuating devices, independently operable totalizers adapted to mesh therewith separately or simultaneously, separate progressive carrying mechanism coöperating with said totalizers, and a series of register wheels 19 designed to mesh with said actuating devices in certain operations of the machine, and a recessional carrying mechanism coöperating with said last mentioned register wheels; substantially as described.

21. In a calculating machine, the combination with two groups of totalizer wheels, means for consecutively registering items in either group, said means in certain operations being capable of transferring items accumulated in one to the other, and in other operations said means being capable of transferring a number from either group of totalizers to a minuend register, and a minuend register; substantially as described.

22. In a calculating machine, the combination with two groups of totalizer wheels, actuating devices therefor, means for rendering either of said groups operative with respect to said actuating devices in additive operations, means for obtaining separate totals from said groups, said actuating devices, in certain operations, being capable of transferring a total from one group to the other, and said actuating devices, in certain other operations, being capable of transferring the total from either group of totalizer wheels to the minuend register, and a minuend register; substantially as described.

23. In a calculating machine, the combination with keys, actuating devices controlled by said keys, recording devices controlled by said actuating devices, a totalizer, and a minuend register, of means for operating the recording devices to make a record of the items and totals of items registered in the totalizer, means for transferring a number from said totalizer to said minuend register, said means also operating said recording devices to make a record of the number transferred from said totalizer to said minuend register, means for operating said recording devices to make a record of the subtrahend, and means for operating said recording devices to make a record of the remainder; substantially as described.

24. In a calculating machine, the combination with type-carrying actuating devices, a laterally shiftable paper carriage, a plurality of totalizers coöperating with said actuating devices, a minuend register also coöperating with said actuating devices, and means for making a printed record of various operations of the machine as determined by positions of said actuating devices and their coöperating totalizers and minuend register; substantially as described.

25. In a calculating machine, the combination with actuating devices carrying printing type, a laterally shiftable paper carriage, type hammers controlled by said actuating devices to make a printing impression, a plurality of totalizers coöperating with said actuating devices, means for introducing items into either or both of said totalizers, whereby a printed record may be made thereof and of the total of items introduced into either or both of said totalizers, means for transferring the number registered in either totalizer to a minuend register, a minuend register, means for introducing a subtrahend in either of said totalizers and making a printed record thereof, and means for articulating the totalizers containing the subtrahend and the minuend register so as to obtain the remainder, for making a printed record of the remainder; substantially as described.

26. In a calculating machine, the combination with adding wheels constituting a subtrahend register, wheels constituting a minuend register, said minuend register, in certain operations, mechanically controlling the subtrahend register to introduce a remainder therein, separate carrying mechanism coöperating with both sets of wheels, and means for simultaneously operating the said separate carrying mechanisms; substantially as described.

27. In a calculating machine, the combination with a minuend register, of a subtrahend register, said minuend register in certain operations mechanically controlling the subtrahend register to introduce a remainder therein, and a progressive carrying mechanism for the subtrahend register, and a recessional carrying mechanism for the minuend register; substantially as described.

28. In a calculating machine, the combination with a minuend register, of a subtrahend register in which numbers may be separately introduced and added together to form a subtrahend, and means for coupling said two registers together to obtain the remainder, the minuend register mechanically controlling said subtrahend register in introducing a remained in the latter; substantially as described.

29. In a calculating machine, the combination with a minuend register, and a plurality of subtrahend registers, whereby the minuend register mechanically controls the selected subtrahend register in introducing a remainder therein; substantially as described.

30. In a calculating machine, the combination with a minuend register, a plurality of subtrahend registers, and means for selectively coupling the particular subtrahend register with said minuend register, whereby the minuend register mechanically controls the selected subtrahend register in introducing a remained therein; substantially as described.

31. In a calculating machine, the combination with a minuend register, a subtrahend register, means for coupling said two registers together to obtain the remainder, and a third register in which a number of remainders may be totalized; said minuend register mechanically controlling said third register when remainders are introduced therein; substantially as described.

32. In a calculating machine, the combination with a minuend register, of recessional carrying mechanism therefor, a subtrahend register, progressive carrying mechanism therefor, means for coupling said two registers together to obtain the remainder, and a separate additive register in which a number of remainders may be totalized, said minuend register mechanically controlling said additive register when remainders are introduced therein; substantially as described.

33. In a calculating machine, the combination with a plurality of registers, one of which is a minuend register, recessional carrying mechanism for said minuend register, and means for preventing the operation of said minuend register and its recessional carrying mechanism during the operation of the other register or registers in additive operations.

34. In a calculating machine, the combination with a minuend register, a subtrahend register, means for coupling said two registers together and obtaining the remainder, an additive register, and means for coupling the minuend register with said additive register whereby the remainder may be cleared from the minuend register and introduced into said additive register, said minuend register mechanically controlling the additive register in such operation; substantially as described.

35. In a calculating machine, the combination with a minuend register, a subtrahend register, means whereby one or more numbers may be added together in the subtrahend register, means for coupling said two registers together and obtaining the correct remainder in the minuend register, and means for transferring the remainder from said minuend register into an additive register, said minuend register mechanically controlling the additive register in such remainder-transferring operation; substantially as described.

36. In a calculating machine, the combination of a set of register wheels rotatable in one direction to represent a number in the nature of a minuend, another set of register wheels for representing a number in the nature of a subtrahend, and means for placing the first mentioned set of register wheels under control of the last mentioned set and reversely rotating the first mentioned set while under such control, whereby a remainder is represented in the first mentioned set of wheels, as a direct result of such operation.

37. In a calculating machine, the combination of a set of register wheels rotatable in one direction to represent a number in the nature of a minuend, means for rotating said wheels forwardly and backwardly, means for representing a number in the nature of a subtrahend, and a key for placing the register wheels under control of the subtrahend representing means, whereby when said wheels are reversely rotated, when under such control, they will be moved to represent the remainder.

38. In a calculating machine, the combination of a set of register wheels rotatable in one direction to represent a number in the nature of a minuend, means for rotating said wheels forwardly and backwardly, means for representing a number in the nature of a subtrahend, a key for placing the register wheels under control of the subtrahend representing means, whereby when said wheels are reversely rotated, when under such control, they will be moved to represent the remainder, and a separate set of register wheels in which the remainders may be accumulated.

39. In a calculating machine, a subtrahend register, a minuend register, a subtrahend key for placing the minuend register under control of said subtrahend register and means for operating the controlled minuend register to obtain the correct remainder therein.

40. In a calculating machine, the combination with a minuend register containing a relatively large number, a subtrahend register containing a relatively small number to be subtracted from the larger number in the minuend register, racks, means for simultaneously engaging said registers with said racks, and means for operating the racks whereby the controlled minuend register will be actuated to represent the correct remainder.

41. In a calculating machine, the combination with a plurality of minuend registers one of which contains a relatively large number, a subtrahend register containing a relatively small number to be subtracted from the larger number in the minuend register containing the same, racks, means for selecting a minuend register for engagement with said racks, means for simultaneously engaging said subtrahend register and said selected minuend register with said racks.

42. In a calculating machine, the combination of a plurality of registers one of which has a recessional carrying mechanism and the others of which have the usual carrying mechanism operable in additive operations, a subtraction key, and means controlled by said subtraction key for coupling two of said registers together in the operation of subtraction.

43. In a calculating machine, the combination of a plurality of minuend registers, racks, means for engaging two of said minuend registers with said racks to transfer numbers from one to the other, a subtrahend register and means for engaging one of said minuend registers and said subtrahend register with said racks to obtain the correct remainder.

44. In a calculating machine, the combination of a plurality of minuend registers one of which contains a relatively large number, a subtrahend register containing a relatively small number to be subtracted from the larger number in said minuend register, means for placing said subtrahend register in control of the said minuend register containing said larger number to obtain a remainder in said minuend register, and means for placing the minuend register in control of another minuend register to transfer the remainder to said other minuend register.

45. In a calculating machine, the combination with a plurality of minuend registers, a subtrahend register, racks for engaging said registers, a subtraction key for simultaneously engaging the subtrahend register and a selected minuend register with said racks to obtain a correct remainder in said minuend register and another key for simultaneously engaging two of said minuend registers with said racks to transfer the remainder from one minuend register to another, whereby said remainders may be accumulated in one of said minuend registers.

46. In a computing machine, the combination with a set of adding wheels, racks for operating same, and subtracting mechanism for reducing the number represented in said adding wheels consisting of a series of wheels adapted to be operated by the racks, and means whereby when any wheel in the subtracting mechanism is moved past zero position, the wheel in the next higher order will be moved backward one step.

47. In a computing machine, a set of wheels constituting a minuend register, a series of racks for simultaneously operating the same, there being one rack for each wheel, printing devices controlled by said racks, and means for simultaneously moving and controlling the racks whereby numbers may be successively subtracted from said minuend register and a record made thereof.

48. In a calculating machine, the combination of a series of wheels indicating a number to be subtracted from, actuating devices for said wheels, there being one actuator for each wheel, and subtracting mechanism comprising means whereby numbers of two or more digits set up on the key board may as whole numbers be successively subtracted from the number indicated in the first mentioned set of wheels.

49. In a calculating machine, the combination of a series of wheels for indicating a number to be subtracted from, actuating device therefor, there being one actuator for differentially and simultaneously actuating each of said wheels, printing mechanism under control of said actuating devices, a key board, and means whereby a number of two or more digits set up on the key board may be printed as a whole number in one operation, and means whereby numbers may be successively set up on the key board, successively printed and successively subtracted from the number indicated in said wheels.

50. In a computing machine, the combination of differentially movable denominational actuators, two sets of wheels controlled thereby, one of said sets of wheels constituting a minuend register in which a minuend may be represented, and means whereby said minuend register may be reversely operated while under the control of said actuators to reduce the minuend represented therein.

51. In a computing machine, the combination of differentially movable denominational actuators, denominational wheels under control of said actuators, said wheels constituting a minuend register in which a minuend may be represented by rotation of said wheels in one direction, a key board for controlling the movement of said actuators, and means whereby a number introduced into the machine through said key board may be taken from the minuend represented in said wheels by reverse rotation thereof.

52. In a computing machine, the combination of a series of denominational racks capable of differential excursions of movement, a set of wheels constituting a minuend register in which a minuend may be represented by rotation of said wheels in one direction, said wheels being under control of said racks, a key board whereby a number representing a subtrahend may be introduced into the machine, and means whereby said subtrahend may be taken from the minuend represented in said set of wheels by reverse rotation of the latter.

53. In a computing machine, the combination of a series of denominational racks capable of differential excursions of movement, a set of wheels constituting a minuend register in which a minuend may be represented by rotation of said wheels in one direction, said wheels being under control of said racks, a key board whereby a number representing a subtrahend may be introduced into the machine, means whereby the subtrahend may be taken from the minuend by reverse rotation of the wheels representing the minuend, and means whereby the remainder represented in said set of wheels after the subtrahend has been subtracted from the minuend, may be returned to zero.

54. In a computing machine, the combination of a series of denominational racks capable of differential movement, printing type which are positioned thereby, means for effecting a printing impression from said type to record the various operations of the machine, a set of wheels capable of operation in one direction to represent a minuend, and which are under the control of said racks, a key board, and means whereby a subtrahend may be set up on said key board and by reverse rotation of the minuend register wheels, subtracted from the minuend in said set of wheels, a record of said subtrahend being made in connection with the operation of subtraction.

55. In a computing machine, the combination of a series of denominational actuators capable of differential movement, a set of wheels under control of said actuators, a key board, means whereby a number may be introduced into said set of wheels through said key board to represent a minuend, and means whereby a subtrahend set up on the key board may be taken from said minuend and said set of wheels left to represent the remainder.

56. In a computing machine, the combination of a series of denominational actuators capable of differential movement, a set of wheels under control thereof, printing mechanism for recording a number introduced into said set of wheels and the total thereof, and means whereby a number may be subtracted from said set of wheels under control of said actuators, a record being made of such subtrahend, the printing mechanism also being operable to record the remainder.

57. In a machine of the character described, the combination of differentially movable racks, wheels movable into and out of engagement therewith, means for introducing a minuend into said wheels, key controlled stops for arresting said racks to represent a subtrahend when the racks are in engagement with the wheels, and carrying mechanism coöperating with said wheels to effect borrowing from a wheel of higher order when the next adjacent wheel of lower order passes zero.

58. In a machine of the character described, the combination of a series of denominational wheels, differentially movable racks coöperating therewith, means for causing the engagement and disengagement between said wheels and racks, whereby, when said wheels and racks are engaged and the racks moved in one direction, a minuend is introduced in the wheels, and when said parts are engaged and the racks moved in the opposite direction, a number is subtracted from said minuend in the wheels, and a carrying mechanism coöperating with said wheels whereby borrowing by a wheel of lower order from the next adjacent wheel of higher order is effected in the operation of subtraction when the wheel of lower order passes zero.

59. In a machine of the character described, the combination of a series of denominational wheels in which a number representing a minuend may be introduced, either before or after the introduction of the subtrahend, a denominational series of differentially movable racks coöperating with said wheels, means for engaging and disengaging the wheels from the racks, means for arresting the excursions of the racks to represent a subtrahend or number to be subtracted from the minuend, and a carrying mechanism coöperating with said wheels to effect borrowing from a wheel of higher order or denomination when the next adjacent wheel of lower order or denomination passes zero, said carrying mechanism being effective throughout the entire series of wheels of higher order when the subtrahend exceeds the minuend, and being automatically arrested at the wheel representing the highest digit of the minuend when the minuend exceeds the subtrahend.

60. In a machine of the character described, the combination of a series of denominational wheels in which a number representing a minuend may be introduced, a series of denominational differentially movable racks coöperating with said wheels, there being an equal number of wheels and racks whereby mutual control is maintained between said parts at all times, and means for controlling said racks to represent a subtrahend whereby said wheels may be rotated in a direction reverse to that taken when an item is introduced thereinto, to subtract an item from the number represented by said wheels.

In testimony whereof I hereto affix my signature in presence of two witnesses.

WILLIAM W. HOPKINS.

Witnesses:
FRANK J. MCCASLIN,
J. D. RILEY.